United States Patent
Sievert

(10) Patent No.: US 11,631,435 B1
(45) Date of Patent: Apr. 18, 2023

(54) SYSTEMS AND METHODS FOR CORRECTING MEDIA CAPTURE-TIMES

(71) Applicant: GoPro, Inc., San Mateo, CA (US)

(72) Inventor: Otto Sievert, Oceanside, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 17/675,821

(22) Filed: Feb. 18, 2022

(51) Int. Cl.
*G11B 27/11* (2006.01)
*G11B 27/34* (2006.01)
*G11B 27/034* (2006.01)

(52) U.S. Cl.
CPC ............ *G11B 27/11* (2013.01); *G11B 27/034* (2013.01); *G11B 27/34* (2013.01)

(58) Field of Classification Search
None
See application file for complete search history.

(56) References Cited

U.S. PATENT DOCUMENTS

| | | | | |
|---|---|---|---|---|
| 5,561,461 A * | 10/1996 | Landis | ............... | H04N 21/47 348/460 |
| 7,034,890 B2 * | 4/2006 | Yang | ............... | H04N 21/4305 348/553 |
| 2002/0149697 A1 * | 10/2002 | Yang | ............... | H04N 21/4143 348/460 |
| 2005/0071872 A1 * | 3/2005 | Case | ............... | H04N 21/4334 386/E5.001 |
| 2020/0374422 A1 * | 11/2020 | Takada | ............... | H04N 5/262 |

* cited by examiner

*Primary Examiner* — Gelek W Topgyal
(74) *Attorney, Agent, or Firm* — Esplin & Associates, PC

(57) ABSTRACT

Media items captured by a media capture device may include and/or be associated with values of a clock-change identifier. The values of the clock-change identifier may be set based on when and how many times the time of the media capture device was changed. Based on a capture-time of a media item being incorrect, other media items with the same value of the clock-change identifier may be determined to be incorrect. Capture-times of the other media items may be corrected based on capture-time correction of the media item.

20 Claims, 5 Drawing Sheets

SYSTEMS AND METHODS FOR CORRECTING MEDIA CAPTURE-TIMES

FIELD

This disclosure relates to correcting media capture-times by grouping media items based on clock changes of a media capture device.

BACKGROUND

A media capture device may be configured with incorrect time. For example, a user may have incorrectly set the clock of the media capture device or the clock of the media capture device may have been reset due to battery drain. Media items captured by the media capture device may have incorrect capture-time. Finding and correcting media items with incorrect capture-times may be difficult and time consuming.

SUMMARY

This disclosure relates to correcting media capture-times. Media item information, capture-time information, clock change information, and/or other information may be obtained. The media item information may define a set of media items. The set of media items may include a first media item, a second media item, and/or other media items. The capture-time information may define capture-times for the set of media items. The capture-times for the set of media items may include a first capture-time for the first media item, a second capture-time for the second media item, and/or other capture-times for other media items. The clock change information may define values of a clock-change identifier for the set of media items. The values of the clock-change identifier for the set of media may include a first value of the clock-change identifier for the first media item, a second value of the clock-change identifier for the second media item, and/or other values of the clock-change identifier for other media items. A first capture-time correction for the first media item may be determined. A group of media items for capture-time correction may be identified based on the values of the clock-change identifier for the set of media items and/or other information. The group of media items may be identified to include the second media item based on the first value of the clock-change identifier and the second value of the clock-change identifier being the same. The capture-time correction for the group of media items based on the first capture-time correction for the first media item and/or other information may be facilitated.

A system for correcting media capture-times may include one or more electronic storage, processor, and/or other components. The electronic storage may store media item information, information relating to media items, capture-time information, information relating to capture-times for media items, clock change information, information relating to values of a clock-change identifier, information relating to incorrect capture-times for media items, information relating to groups of media items for capture-time correction, information relating to capture-time correction, and/or other information.

The processor(s) may be configured by machine-readable instructions. Executing the machine-readable instructions may cause the processor(s) to facilitate correcting media capture-times. The machine-readable instructions may include one or more computer program components. The computer program components may include one or more of a media component, capture-time component, clock change component, capture-time correction component, group component, group correction component, and/or other computer program components.

The media component may be configured to obtain media item information and/or other information. The media item information may define a set of media items. The set of media items may include a first media item, a second media item, and/or other media items.

The capture-time component may be configured to obtain capture-time information for the set of media items and/or other information. The capture-time information may define capture-times for the set of media items. The capture-times for the set of media items may include a first capture-time for the first media item, a second capture-time for the second media item, and/or other capture-times for other media items.

The clock change component may be configured to obtain clock change information for the set of media items and/or other information. The clock change information may define values of a clock-change identifier for the set of media items. The values of the clock-change identifier for the set of media may include a first value of the clock-change identifier for the first media item, a second value of the clock-change identifier for the second media item, and/or other values of the clock-change identifier for other media items.

In some implementations, the values of the clock-change identifier for the set of media items may be determined based on change in time of a media capture device that captured the set of media items and/or other information. In some implementations, the values of the clock-change identifier for the set of media items may be changed based on the change in the time of the media capture device that captured the set of media items and/or other information.

The capture-time correction component may be configured to determine one or more capture-time correction for one or more of the media items. For example, the capture-time correction component may be configured to determine a first capture-time correction for the first media item.

The group component may be configured to identify a group of media items for capture-time correction based on the values of the clock-change identifier for the set of media items and/or other information. The group of media items may be identified to include the second media item based on the first value of the clock-change identifier and the second value of the clock-change identifier being the same.

In some implementations, the group of media items may be identified for the capture-time correction based on determination that the first capture-time for the first media item is incorrect. In some implementations, the first capture-time for the first media item may be determined to be incorrect based on a difference between the first capture-time for the first media item and a GPS time for the first media item.

In some implementations, the first capture-time for the first media item may be determined to be incorrect based on the difference between the first capture-time for the first media item and GPS time for the first media item being greater than twenty-six hours. In some implementations, the first capture-time for the first media item may be determined to be incorrect further based on a GPS location for the first media item.

The group correction component may be configured to facilitate the capture-time correction for the group of media items. The capture-time correction for the group of media items may be performed based on the first capture-time correction for the first media item and/or other information. The capture-time correction for the group of media items may be performed based on propagation of the first capture-time correction for the first media item to the group of media items.

In some implementations, facilitation of the capture-time correction for the group of media items may include automatically changing the capture-times for the group of media items based on the first capture-time correction for the first media item and/or other information. In some implementation, facilitation of the capture-time correction for the group of media items may include prompting a user to suggest changing the capture-times for the group of media items based on the first capture-time correction for the first media item.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
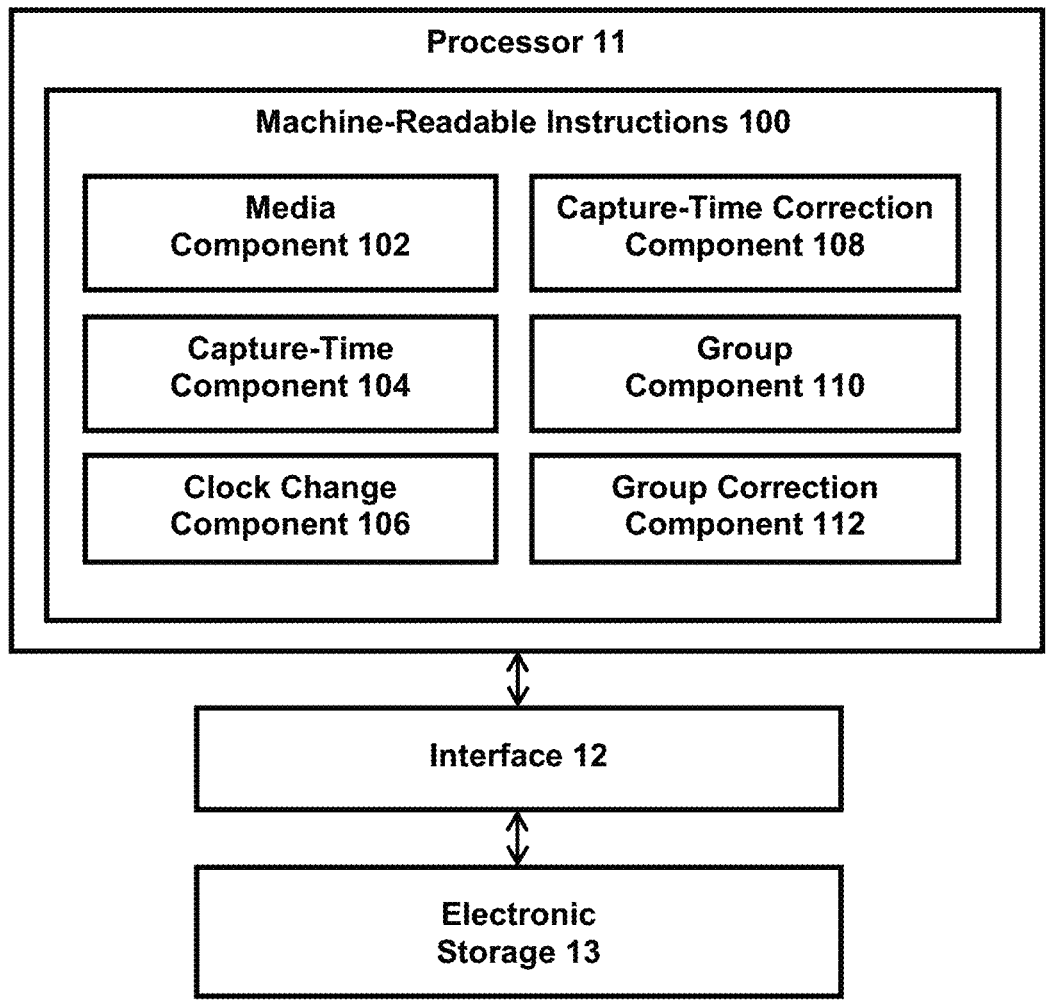
FIG. 1 illustrates an example system for correcting media capture-times.

FIG. 1 illustrates a system 10 for correcting media capture-times. The system 10 may include one or more of a processor 11, an interface 12 (e.g., bus, wireless interface), an electronic storage 13, and/or other components. In some implementations, the system 10 may include one or more optical elements, one or more image sensors, and/or other components. Media item information, capture-time information, clock change information, and/or other information may be obtained by the processor 11. The media item information may define a set of media items. The set of media items may include a first media item, a second media item, and/or other media items. The capture-time information may define capture-times for the set of media items. The capture-times for the set of media items may include a first capture-time for the first media item, a second capture-time for the second media item, and/or other capture-times for other media items. The clock change information may define values of a clock-change identifier for the set of media items. The values of the clock-change identifier for the set of media may include a first value of the clock-change identifier for the first media item, a second value of the clock-change identifier for the second media item, and/or other values of the clock-change identifier for other media items. A first capture-time correction for the first media item may be determined by the processor 11. A group of media items for capture-time correction may be identified by the processor 11 based on the values of the clock-change identifier for the set of media items and/or other information. The group of media items may be identified to include the second media item based on the first value of the clock-change identifier and the second value of the clock-change identifier being the same. The capture-time correction for the group of media items based on the first capture-time correction for the first media item and/or other information may be facilitated by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store media item information, information relating to media items, capture-time information, information relating to capture-times for media items, clock change information, information relating to values of a clock-change identifier, information relating to incorrect capture-times for media items, information relating to groups of media items for capture-time correction, information relating to capture-time correction, and/or other information.

Media items may be captured by one or more media capture devices. Media items may refer to items that may be visually and/or audibly consumed. Media items may refer to multimedia items. For example, media items may include images, videos, sound clips, and/or other media items.

A media capture device may refer to a device that captures media items. A media capture device may capture media items in form of images, videos, sound clips, and/or other forms. For example, a media capture device may include an image capture device, a sound capture device, and/or other capture device. An image capture device may capture visual content in form of images, videos, and/or other forms. An image capture device may include one or more optical elements, one or more image sensors, and/or other components. The optical element(s) (e.g., lens) may guide light within a field of view to the image sensor(s). The image sensor(s) may convert the received light into output signals that convey information defining visual content of image(s). A sound capture device may capture audio content in form of sound clips and/or other forms. A sound capture device may include one or more sound sensors (e.g., microphone) and/or other components. The sound sensor may receive and convert sound into output signals that convey information defining audio content of sound clip(s). A media capture device may be a standalone device (e.g., camera, image sensor, microphone) or may be part of another device (e.g., part of a smartphone, tablet). Other types of media capture devices are contemplated.

Media items may include and/or be associated with metadata relating to capture of the media items. For example, media items may include and/or be associated with metadata that defines capture-times for the media items. A capture-time for a media item may refer to a time when the media item was captured by the media capture device. The value of capture time for a media item may specify when (e.g., date, hour, minute, second) the media item was captured by the media capture device. The value of capture-time for a media item may be set based on the time of the media capture device. Time of the media capture device may refer to time that is tracked/used by the media capture device.

For example, a user may set the time of an image capture device by specifying the date, the hour, and the minute at a particular moment. The time of the image capture device may change with passage of time in the real world. When the image capture device captures an image or a video, the metadata for the image/the video may include values that specify when the image/video was captured according to the time of the image capture device.

Capture-times of media items may be useful for consuming the media items. For example, media items may be sorted/presented in an order based on the capture-times (e.g., in ascending or descending order). Media items may be grouped so that media items captured around the same capture-times are grouped together (e.g., grouping based on same capture day, week, month, year, etc.).

If incorrect value of capture-time is stored for a media item, the media item may appear out-of-order in the sorting and/or placed in the wrong grouping. Such media item may appear to be "lost" to the user. For example, media items in a media library may be sorted based on the capture-times so that the latest media items are presented first (e.g., at the top) and the oldest media items are presented last (e.g., at the bottom). If the capture-time for a recently captured media item is incorrect, then the media item may not be presented first. The media item with the incorrect capture time may appear somewhere within the listing of media items or near the end. When the media item is not found in the expected location within the media library, the user may believe that the media item was lost. For example, the user may believe that the media item was deleted from memory or that the capture of the media item failed.

Figure 3A:
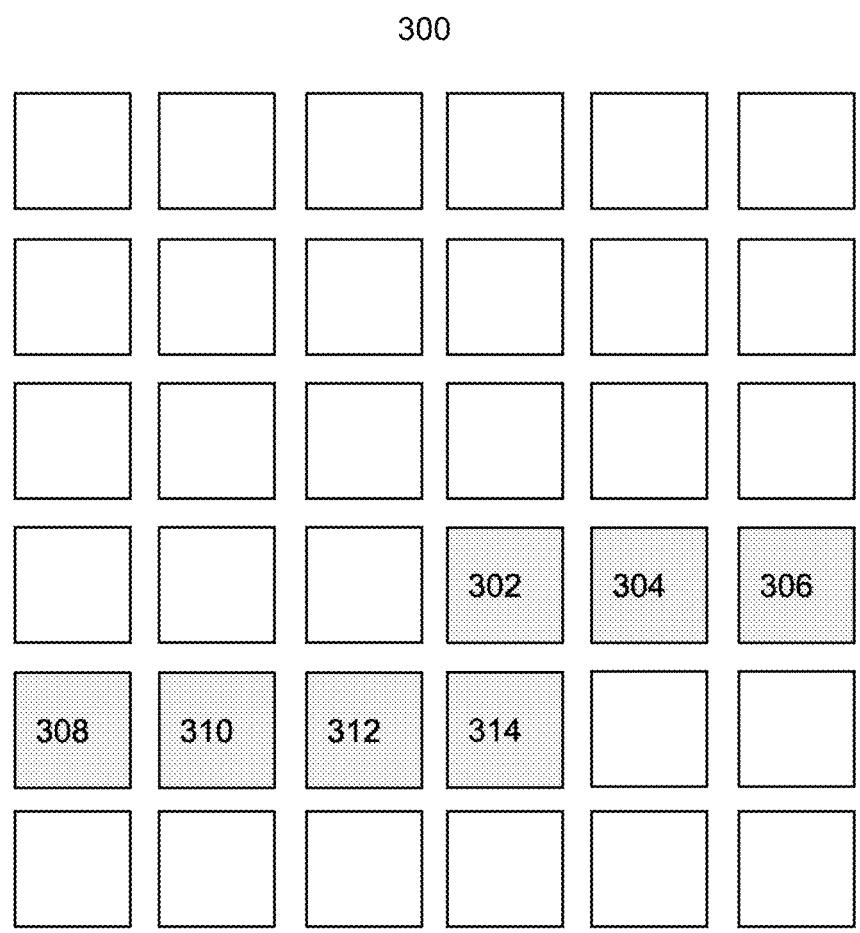
FIG. 3A illustrates an example ordering of media items.

FIG. 3A illustrates an example ordering of media items 300. The media items may be ordered based on the capture-times of the media items. The media items may be ordered so that media items with earlier capture-times are placed ahead of media items with later capture-times. The ordering 300 may include media items that are out of place due to incorrect capture-times. For example, media items 302, 304, 306, 308, 310, 312, 314 may be placed later in the ordering 300 than they should be because they were captured by a media capture device with a time/clock that was ahead of the actual time. For example, the time/clock of the media capture device may have been ahead of the actual time by four hours, and the capture times of the media items 302, 304, 306, 308, 310, 312, 314 may be off by four hours—four hours later than the actual time at which they were captured.

The capture time for a media item may be incorrect based on user error or system error. For example, the user may have set the time of the media capture device to an incorrect value (e.g., off by minutes, hours, days, months, years) during setup. As another example, the user may have set the time of the media capture device correctly but failed to change the time when the user traveled to a different time zone or when daylight saving time adjusts the current time. As yet another example, the time of the media capture device may have reset (e.g., when battery of the media capture device drains) and uncorrected to the proper value. For instance, when the battery of the media capture device drains, the time of the media capture device may reset to a default time or a random time.

The system 10 may be remote from a media capture device or local to the media capture device. One or more portions of the media capture device may be remote from or be a part of the system 10. One or more portions of the system 10 may be remote from or be a part of the media capture device. For example, one or more components of the system 10 may be carried by a housing, such as a housing of a media capture device. As another example, one or more components of the system 10 may be part of a computing device separate from the media capture device, such as a mobile device (e.g., smartphone, tablet, laptop) or a desktop device (e.g., desktop computer).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate correcting media capture-times. The machine-readable instructions 100 may include one or more computer program components. The machine-readable instructions 100 may include one or more of a media component 102, capture-time component 104, clock change component 106, capture-time correction component 108, group component 110, group correction component 112, and/or other computer program components.

The media component 102 may be configured to obtain media item information and/or other information. Obtaining media item information may include one or more of accessing, acquiring, analyzing, capturing, determining, examining, generating, identifying, loading, locating, opening, receiving, retrieving, reviewing, selecting, storing, and/or otherwise obtaining the media item information. The media component 102 may obtain media item information from one or more locations. For example, the media component 102 may obtain media item information from a storage location, such as the electronic storage 13, electronic storage of information and/or signals generated by one or more sensors, electronic storage of a device accessible via a network, and/or other locations. The media component 102 may obtain media item information from one or more hardware components (e.g., an image sensor, an image capture device, a sound sensor, a sound capture device, a media capture device, a network device, a storage device) and/or one or more software components (e.g., software running on a computing device).

In some implementations, the media component 102 may obtain media item information based on user interaction with a user interface/application (e.g., media editing application, media viewing/player application), and/or other information. For example, a user interface/application may provide option(s) for a user to select media items for viewing/capture-time correction. For instance, the user interface/application may provide option(s) for a user to select specific media items, select media items based on location in which the media items are stored, select media items based on metadata for the media items (e.g., location in which the media items were captured, date on which the media item were captured), select media items based on content depicted within the media items (e.g., classification of things depicted within the media items, such as objects, people, activity, emotion, and/or scenery), select media items based on type of media items, and/or otherwise select media items for viewing/capture-time correction. Other selections of media items for retrieval of media item information are contemplated.

The media item information may define a set of media items. A set of media items may include multiple media items. A set of media items may include a group of media items. For example, the set of media items may include a first media item, a second media item, and/or other media items. For instance, the set of media items may include one or more images, one or more videos, one or more sound clips, and/or other media items. Individual media items may be stored in a single file or in multiple files. Multiple media items may be stored in a single file or in multiple files.

In some implementations, media item(s) may be included within a set of media items manually (e.g., manual selection of media items by a user for inclusion within a set) and/or automatically (e.g., automatic selection of media items by software/algorithm for inclusion within a set). For example, a set of media items may include media items grouped together based on when they were captured (e.g., grouping based on similar/same time/day/month/season/year of capture), where they were captured (e.g., grouping based on similar/same location/area of capture), what they captured (e.g., grouping based on similar/same type of activity/entity/scene captured), and/or other factors.

The media item information may define a set of media items by including information that defines one or more content, qualities, attributes, features, and/or other aspects of the set of media items. For example, the media item information may define a set of media items by including information that makes up the content of the set of media items and/or information that is used to determine the content of the set of media items. For instance, the media item information may include information that makes up and/or is used to determine media items within the set of media items (e.g., information defining content of images, videos, sound clips), information that defines and/or is used to determine which media items are included within the set of media items, and/or other information that defines the set of media items. The media item information may be stored within a single file or multiple files. Other types of media item information are contemplated.

The capture-time component 104 may be configured to obtain capture-time information for the set of media items and/or other information. Obtaining capture-time information may include one or more of accessing, acquiring, analyzing, capturing, determining, examining, generating, identifying, loading, locating, opening, receiving, retrieving, reviewing, selecting, storing, and/or otherwise obtaining the capture-time information. The capture-time component 104 may obtain capture-time information from one or more locations. For example, the capture-time component 104 may obtain capture-time information from a storage location, such as the electronic storage 13, electronic storage of information and/or signals generated by one or more sensors, electronic storage of a device accessible via a network, and/or other locations. The capture-time component 104 may obtain capture-time information from one or more hardware components (e.g., an image sensor, an image capture device, a sound sensor, a sound capture device, a media capture device, a network device, a storage device) and/or one or more software components (e.g., software running on a computing device).

In some implementations, the capture-time information may be obtained with the media item information. For example, the capture-time information may be part of the media item information. For instance, the capture-time information may be stored within a metadata track of a media file. In some implementations, obtaining the capture-time information may include identifying/extracting the capture-time information from the media file.

The capture-time information may define capture-times for the set of media items. The capture-time information may define values of capture-times for individual media items within the set of media items. For example, the capture-time information may define a first capture-time for the first media item (value of capture-time for the first media item), a second capture-time for the second media item (value of capture-time for the second media item), and/or other capture-times for other media items.

The capture-time information may define capture-times for the set of media items by including information that defines one or more content, qualities, attributes, features, and/or other aspects of the capture times-for the set of media items. For example, the capture-time information may define capture-times for the set of media items by including information that makes up/specifies the capture-times for the set of media items and/or information that is used to determine the capture-times for the set of media items. The capture-time information may be stored within/with the media item information or separately from the media item information. Other types of capture-time information are contemplated.

The clock change component 106 may be configured to obtain clock change information for the set of media items and/or other information. Obtaining clock change information may include one or more of accessing, acquiring, analyzing, capturing, determining, examining, generating, identifying, loading, locating, opening, receiving, retrieving, reviewing, selecting, storing, and/or otherwise obtaining the capture-time information. The clock change component 106 may obtain clock change information from one or more locations. For example, the clock change component 106 may obtain clock change information from a storage location, such as the electronic storage 13, electronic storage of information and/or signals generated by one or more sensors, electronic storage of a device accessible via a network, and/or other locations. The clock change component 106 may obtain clock change information from one or more hardware components (e.g., an image sensor, an image capture device, a sound sensor, a sound capture device, a media capture device, a network device, a storage device) and/or one or more software components (e.g., software running on a computing device).

In some implementations, the clock change information may be obtained with the capture-time information or the media item information. For example, the clock change information may be part of the capture-time information or the media item information. For instance, the clock change information may be stored within a metadata track of a media file. In some implementations, obtaining the clock change information may include identifying/extracting the clock change information from the media file.

The clock change information may define values of a clock-change identifier for the set of media items. The clock change information may define values of a clock-change identifier for individual media items within the set of media items. For example, the clock change information may define a first value of the clock-change identifier for the first media item, a second value of the clock-change identifier for the second media item, and/or other values of the clock-change identifier for other media items. A clock-change identifier may refer to an identifier (e.g., characters and/or numbers) that identifies a specific configuration of the time of the media capture device. A clock-change identifier may refer to an identifier that identifies a particular clock setting under which the media capture device operated during capture of media items. A clock setting may refer to setting of the time of the media capture device.

In some implementations, the values of the clock-change identifier for the set of media items may be determined based on change in time of a media capture device that captured the set of media items and/or other information. The values of the clock-change identifiers for the set of media items may be set based on when and how many times the time of the media capture device was changed. The media capture device may change the value of the clock-change identifier when the time (clock) of the media capture device is changed. The media capture device may keep track of the current value of the clock-change identifier and set the value of the clock-change identifier for a media item to the value of the clock-change identifier tracked by the media capture device when the media item is captured.

In some implementations, the values of the clock-change identifier for the set of media items may be changed based on the change in the time of the media capture device that captured the set of media items and/or other information. When the time (clock) of the media capture device is change, the current value of the clock-change identifier may be changed. For example, the current value of the clock-change identifier may be incremented when the time of the media capture device is changed. For instance, the media capture device may have a persistent counter that is used as the value of the clock-change identifier. The persistent counter may have an initial value (e.g., 1). When the time (clock) of the media capture device is changed (e.g., manually by a user, based on automatic update to the time (clock) via communication with a mobile device or reception of GPS time, based on drainage of media capture device battery), the persistent counter may be incremented. As another example, the current value of the clock-change identifier may be changed to a different unique identifier. For instance, a pseudo-random value generator may be used to generate a unique identifier when the time of the media capture device is changed. Other changes in the value of the clock-change identifier are contemplated.

When a media item is captured by the media capture device, the current value of the clock-change identifier of the media capture device (e.g., the value of the persistent counter, the unique identifier) may be stored as/used to generate the value of the clock-change identifier for the media item. Media items that are captured by the media capture device under the same time/clock setting may have the same value of the clock-change identifier. Media items that are captured by the media capture device under different time/clock settings may have the different values of the clock-change identifier.

In some implementations, the values of the clock-change identifier for the set of media items may include and/or be associated with identifiers (e.g., characters and/or numbers) that identify the media capture device that captured the media item. For example, the values of the clock-change identifiers for images/videos captured by an image capture device may include and/or be associated with an identifier for the image capture device. The identifiers for the media capture devices may be used to differentiate between media items that were captured by different media capture devices.

The clock change information may define values of a clock-change identifier for the set of media item by including information that defines one or more content, qualities, attributes, features, and/or other aspects of the clock-change identifier for the set of media item. For example, the clock change information may define values of a clock-change identifier for the set of media item by including information that makes up/specifies the values of the clock-change identifier for the set of media item and/or information that is used to determine the values of the clock-change identifier for the set of media items. The clock change information may be stored within/with the media item information/the capture-time information or separately from the media item information/the capture-time information. Other types of clock change information are contemplated.

The capture-time correction component 108 may be configured to determine one or more capture-time correction for one or more of the media items. Determining a capture-time correction for a media item may include ascertaining, calculating, establishing, finding, identifying, obtaining, setting, and/or otherwise determining the capture-time correction for the media item. A capture-time correction for a media item may refer to a change in the capture-time of the media item. A capture-time correction for a media item may refer to a change in the capture-time of the media item so that the capture-time of the media item is correct (e.g., identifies the actual time at which the media item was captured). A capture-time correction for a media item may change the value of the capture-time for the media item from an incorrect value to a correct value.

For example, the capture-time correction component 108 may be configured to determine a first capture-time correction for the first media item and/or other capture-time correction for other media items. The first capture-time correction for the first media item may correct the value of the capture-time for the first media item (correct the first capture-time). For instance, the first capture-time for the first media item may be off by a certain duration of time (e.g., ahead by four hours). The first capture-time correction may change the first capture-time by the duration of time by which the time is off (e.g., subtract four hours).

Figure 3B:
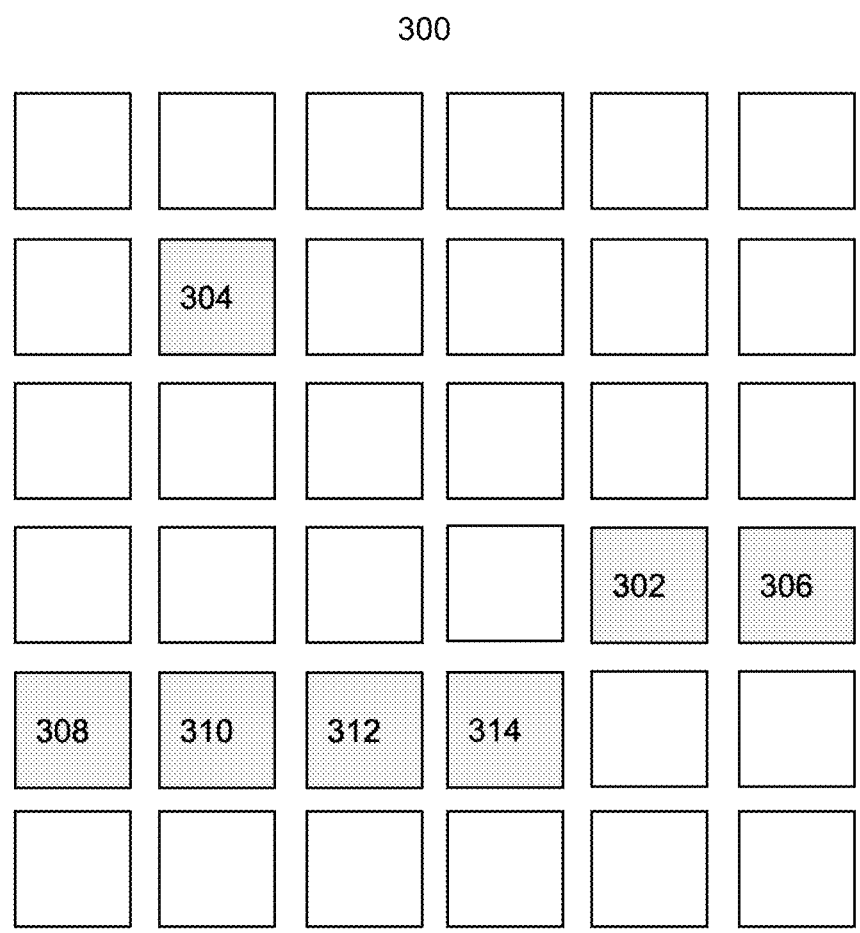
FIG. 3B illustrates an example change to the ordering of media items based on capture-time correction to a single media item.

FIG. 3B illustrates an example change to the ordering of media items based on capture-time correction to a single media item. Capture-time correction may have been applied to the media item 304 to change the capture-time of the media item 304 from an incorrect value to a correct value. For example, the capture-time of the media item 304 may have been ahead of the actual time by four hours. The capture-time of the media item 304 may have been corrected by subtracting four hours. The change in the capture-time of the media item 304 may result in the position of the media item 304 changing within the ordering 300. The position of the media item 304 may be changed to an earlier/higher position in the ordering 300. Other changes in the ordering of the media items are contemplated.

A capture-time correction for a media item may be determined manually and/or automatically. Manual determination of the capture-time correction may include obtaining the capture-time correction from a user. For instance, a user may provide input to the system to specify the values of capture-time correction for a media items (e.g., provide the correct capture-time for the media item, provide offset in the capture-time for the media item). Automatic determination of the capture-time correction may include analysis of information about the capture-time and/or the media item. For example, Automatic determination of the capture-time correction may include use of information on the actual time when the media capture device captured the media item. For instance, the media capture device may have received information on GPS time when capturing the media item. The GPS time may include the actual time at the location of the media capture device. The GPS time may include UTC time, and the actual time at the location of the media capture device may be determined based on the UTC time and the time zone in which the media capture device is located. The GPS time may be used to determine the capture-time correction for the media item. The capture-time correction for the media item may be determined to change the capture-time to be consistent with the GPS time.

In some implementations, determination of a capture-time correction for a media item may include determination that the capture-time for the media item is incorrect. The capture-time for the media item may be determined to be incorrect manually and/or automatically. For example, manual determination of the capture-time being incorrect may include obtaining identification of the media item as having incorrect capture-time from a user. For instance, a user may provide input to the system 10 that the capture-time for the media item is wrong.

Automatic determination of the capture-time being incorrect may include analysis of information about the capture-time and/or the media item. In some implementations, automatic determination of the capture-time as being incorrect may include use of information on the actual time when the media capture device captured the media item.

The capture-time for the media item may be determined to be incorrect based on a difference between the capture-time for the first media item and a GPS time for the media item. For instance, the media capture device may have received information on GPS time when capturing the media item. Difference between the capture time of the media item/time of the media capture device and the time at the location of the media capture device as indicated by the GPS time may be used to determine that the capture-time of the media item is incorrect. For example, based on the difference between the capture time of the media item/time of the media capture device and the time at the location of the media capture device as indicated by the GPS time being greater than a threshold duration, the capture-time of the media item may be determined to be incorrect.

In some implementations, the capture-time for the media item may be determined to be incorrect based on the difference between the capture-time for the media item and GPS time for media item (UTC time when the media item was captured) being greater than twenty-six hours. A difference between the capture-time for the media item and GPS time for media item being greater than twenty-six hours may indicate that the capture-time is incorrect since no location should be off from the UTC time by more than twenty-six hours.

In some implementations, the capture-time for the media item may be determined to be incorrect further based on a GPS location for the media item. The GPS location may identify the location at which the media capture device captured the media item. Based on the GPS location, the time zone in which the media capture device was located may be determined and used to adjust the UTC time to determine the time at the location of the media capture device. The difference between the capture time of the media item/time of the media capture device and the time at the location of the media capture device may be used to determine that the capture-time of the media item is incorrect.

In some implementations, automatic determination of the capture-time as being incorrect may include use of the name/metadata for the media item. The name/metadata for the media item may include a value (e.g., number) that increases to identify individual media items that are captured by the media capture device. For example, the name/metadata for the media item may include a number that monotonically increases whenever a new media item is captured. The capture-time for the media item may be determined to be incorrect based on the name/metadata for the media item and the capture-time for the media item providing conflicting information on when the media item was captured. For example, the names/metadata for a first media item and a second media item may indicate that the first media item was captured before the second media item, but the capture-times for the first media item and the second media item may indicate that the first media item was captured after the second media item. In such a case, the capture-times for the first media item or the second media item may be determined to be incorrect.

In some implementations, automatic determination of the capture-time as being incorrect may include use of the values of the clock-change identifier for the media items. In the case in which the clock-change identifier increases with every change in the time/clock of the media capture device, a media item having a lower value of the clock-change identifier should have an earlier capture-time than a media item having a higher value of the clock-change identifier. The capture-time for the media item may be determined to be incorrect based on the value of the clock-change identifier for the media item and the capture-time for the media item providing conflicting information on when the media item was captured. For example, the values of the clock-change identifier for a first media item and a second media item may indicate that the first media item was captured before the second media item, but the capture-times for the first media item and the second media item may indicate that the first media item was captured after the second media item. In such a case, the capture-times for the first media item or the second media item may be determined to be incorrect. Thus, the clock-change identifier may make errors in capture-times for media items more detectable.

In some implementations, automatic determination of the capture-time as being incorrect may include use of offload-time for the media items. Offload-times for the media items may refer to times when the media items were offloaded from the media capture device to another computing device (e.g., downloaded to a computer, transferred to a mobile device or a server). A relationship may exist between when the media items are captured and when the media items are offloaded from the media capture device. In general, media items that are captured earlier may be offloaded earlier than media items that are captured layer. The capture-time for the media item may be determined to be incorrect based on the offload-time for the media item and the capture-time for the media item providing conflicting information on when the media item was captured. For example, the offload-times for a first media item and a second media item may indicate that the first media item was offloaded before the second media item, but the capture-times for the first media item and the second media item may indicate that the first media item was captured after the second media item. In such a case, the capture-times for the first media item or the second media item may be determined to be incorrect.

The group component 110 may be configured to identify one or more groups of media items for capture-time correction based on the values of the clock-change identifier for the set of media items and/or other information. Identifying a group of media items may include ascertaining, choosing, discovering, finding, selecting, and/or otherwise identifying the group of media items. A group of media items may include all media items within the set of media items or some media items within the set of media items. A group of media items may be identified to include media items that have the same value of clock-change identifier. Media items having the same value of clock-change identifier may be grouped together for capture-time correction. If a media item within a group is determined to have incorrect capture-time, then other media items within the same may have incorrect capture-times. The inaccuracy of the capture-time for the one media item may be found in other media items within the group.

In some implementations, the media items may be grouped together before determination that capture-time of any media item is incorrect. That is, groups of media items may be identified using the values of the clock-change identifier before any need to correct the capture-times of media items is determined. In some implementations, the media items may be grouped together after determination that capture-time of one or more media items are incorrect. That is, groups of media items may be identified using the values of the clock-change identifier after the need to correct the capture-times of media items is determined. A group of media items may be identified to include media items that include the same value of the clock-change identifier as the media item for which capture-time correction has been determined. For example, a group of media items may be identified for capture-time correction based on determination that the capture-time for a first media item is incorrect. The group of media items may be identified to include a second media item based on the value of the clock-change identifier for the first media item and the value of the clock-change identifier for the second media item being the same.

In some implementations, a group of media items may be identified to include the media item for which capture-time correction has been determined. For example, based on a capture-time correction being determined for a first media item, a group of media items may be identified to include the first media item and other media items that have the same value of the clock-change identifier as the first media item. Such grouping of media items may allow for the capture-time correction determined for a single media item to be applied to all of the media items that have the same value of the clock-change identifier.

In some implementations, a group of media items may be identified to exclude the media item for which capture-time correction has been determined. For example, based on a capture-time correction being determined for a first media item, a group of media items may be identified to exclude the first media item while including other media items that have the same value of the clock-change identifier as the first media item. Such grouping of media items may be performed when the capture-time correction has been applied to the single media item. That is, rather than waiting to apply the capture-time correction to all media items with the same value of the clock-change identifier, the capture-time correction may be first applied to the media item for which the capture-time correction has been determined. Such grouping of media items may allow for the capture-time correction determined for a single media item to be applied to all other media items that have the same value of the clock-change identifier as the single media item.

The group correction component 112 may be configured to facilitate capture-time correction for one or more groups of media items. The group correction component 112 may be configured to facilitate the use of the capture-time correction for a media item to perform capture-time correction for a group of media items. The capture-time correction for a group of media items may be performed based on the capture-time correction for a media item and/or other information. For example, the capture-time correction for a group of media items that have the same value of clock-change identifier as the first media item may be performed based on the capture-time correction for the first media item. The capture-time correction for the group of media items may be performed based on propagation of the capture-time correction for the first media item to the group of media items. Since the media items within the group likely all have the same inaccuracy in the capture-time as the first media item, the same capture-time correction applied to the first media item may be applied to the media items within the group to correct all of the media items within the group. Thus, rather than requiring the user to individually identify the capture times of media items as being incorrect and providing the correct times, the time offset used to correct one media item may be used to correct a group of media items. Thus, incorrect capture-times of a large number of media items may be corrected at once.

In some implementations, facilitating the capture-time correction for a group of media items may include automatically performing the capture-time correction for the group of media using the capture-time correction for a media item. The capture-time correction for the group of media may be performed by automatically changing the capture-times for the group of media items based on the capture-time correction for the media item and/or other information.

In some implementations, facilitating the capture-time correction for a group of media items may include prompting a user to suggest changing the capture-times for the group of media items based on the capture-time correction for a media item and/or other information. Based on determination of the capture-time correction for a media item, a user may be prompted on whether other media items with the same value of the clock-change identifier should be changed by the same amount. Responsive to the user indicating that the capture-times of other media items should be changed, the capture-time correction for the media item may be propagated (applied) to the other media items.

Figure 3C:
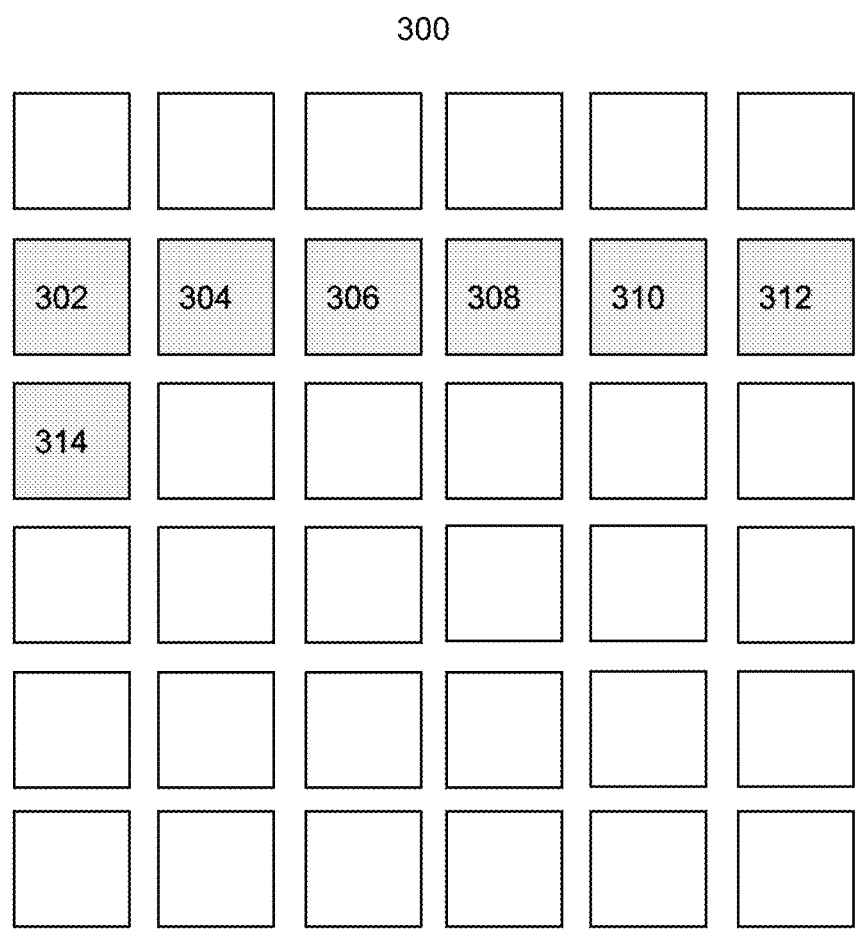
FIG. 3C illustrates an example change to the ordering of media items based on propagation of the capture-time correction to the single media item to a group of media items.

FIG. 3C illustrates an example change to the ordering of media items 300 based on propagation of the capture-time correction to the media item 304 to a group of media items. The media items 302, 306, 308, 310, 312, 314 may have the same value of the clock-change identifier as the media item 304. The media items 302, 306, 308, 310, 312, 314 may be grouped together for capture-time correction. As shown in FIG. 3B, capture-time correction applied to the media item 304 may have moved the position of the media item 304 to an earlier/higher position in the ordering 300. Applying the same capture-time correction for the media item 304 to the media items 302, 306, 308, 310, 312, 314 may result in the positions of the media items 302, 306, 308, 310, 312, 314 being moved to earlier/higher positions in the ordering 300.

While the capture-times of the media items 302, 304, 306, 308, 310, 312, 314 are shown in FIGS. 3A and 3B as being changed sequentially (with the capture-time of the media item 304 being changed first before the same change being applied to the media items 302, 306, 308, 310, 312, 314), this is merely as an example and is not meant to be limiting. In some implementations, the capture-times of the media item for which the capture-time correction is identified (e.g., the media item 304) may be changed with other media items that have the same value of the clock-change identifier.

While the media item for which the capture-time correction is determined is shown as being the second media item within the group in FIG. 3A, this is merely as an example and is not meant to be limiting. The media item for which the capture-time correction is determined may be the first media item within the group, an intermediate media item within the group, or the last media item within the group.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
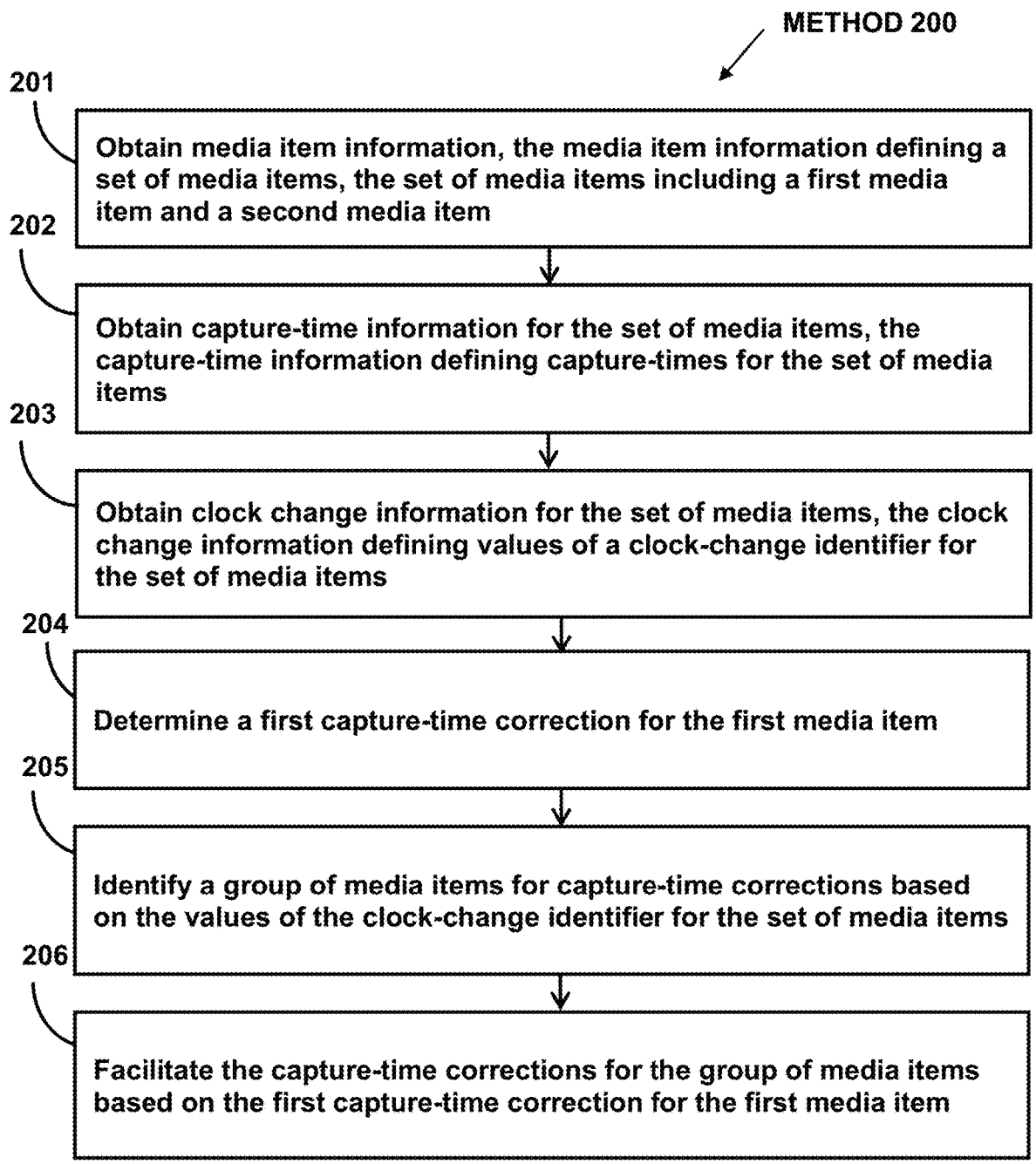
FIG. 2 illustrates an example method for correcting media capture-times.

FIG. 2 illustrates method 200 for correcting media capture-times. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, media item information and/or other information may be obtained. The media item information may define a set of media items. The set of media items may include a first media item, a second media item, and/or other media items.

In some implementations, operation 201 may be performed by a processor component the same as or similar to the media component 102 (Shown in FIG. 1 and described herein).

At operation 202, capture-time information and/or other information may be obtained. The capture-time information may define capture-times for the set of media items. The capture-times for the set of media items may include a first capture-time for the first media item, a second capture-time for the second media item, and/or other capture-times for other media items. In some implementations, operation 202 may be performed by a processor component the same as or similar to the capture-time component 104 (Shown in FIG. 1 and described herein).

At operation 203, clock change information and/or other information may be obtained. The clock change information may define values of a clock-change identifier for the set of media items. The values of the clock-change identifier for the set of media may include a first value of the clock-change identifier for the first media item, a second value of the clock-change identifier for the second media item, and/or other values of the clock-change identifier for other media items. In some implementations, operation 203 may be performed by a processor component the same as or similar to the clock change component 106 (Shown in FIG. 1 and described herein).

At operation 204, a first capture-time correction for the first media item may be determined. In some implementations, operation 204 may be performed by a processor component the same as or similar to the capture-time correction component 108 (Shown in FIG. 1 and described herein).

At operation 205, a group of media items for capture-time correction may be identified based on the values of the clock-change identifier for the set of media items and/or other information. The group of media items may be identified to include the second media item based on the first value of the clock-change identifier and the second value of the clock-change identifier being the same. In some implementations, operation 205 may be performed by a processor component the same as or similar to the group component 110 (Shown in FIG. 1 and described herein).

At operation 206, the capture-time correction for the group of media items based on the first capture-time correction for the first media item and/or other information may be facilitated. In some implementations, operation 206 may be performed by a processor component the same as or similar to the group correction component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for correcting media capture-times, the system comprising:
one or more physical processors configured by machine-readable instructions to:
obtain media item information, the media item information defining a set of media items, the set of media items including a first media item and a second media item;
obtain capture-time information for the set of media items, the capture-time information defining capture-times for the set of media items, the capture-times for the set of media items including a first capture-time for the first media item and a second capture-time for the second media item;
obtain clock change information for the set of media items, the clock change information defining values of a clock-change identifier for the set of media items, the values of the clock-change identifier for the set of media including a first value of the clock-change identifier for the first media item and a second value of the clock-change identifier for the second media item, wherein the values of the clock-change identifier for the set of media items are changed based on change in time of a media capture device that captured the set of media items;
determine a first capture-time correction for the first media item;
identify a group of media items for capture-time correction based on the values of the clock-change identifier for the set of media items, wherein the group of media items is identified to include the second media item based on the first value of the clock-change identifier and the second value of the clock-change identifier being the same; and
facilitate the capture-time correction for the group of media items based on propagation of the first capture-time correction for the first media item to the group of media items.

2. The system of claim 1, wherein:
the values of the clock-change identifier for the set of media items are incremented based on the change in the time of the media capture device that captured the set of media items; and
the first capture-time for the first media item is determined to be incorrect based on a difference between the first capture-time for the first media item and a GPS time for the first media item.

3. A system for correcting media capture-times, the system comprising:
one or more physical processors configured by machine-readable instructions to:
obtain media item information, the media item information defining a set of media items, the set of media items including a first media item and a second media item;
obtain capture-time information for the set of media items, the capture-time information defining capture-times for the set of media items, the capture-times for the set of media items including a first capture-time for the first media item and a second capture-time for the second media item;
obtain clock change information for the set of media items, the clock change information defining values of a clock-change identifier for the set of media items, the values of the clock-change identifier for the set of media including a first value of the clock-change identifier for the first media item and a second value of the clock-change identifier for the second media item;
determine a first capture-time correction for the first media item;

identify a group of media items for capture-time correction based on the values of the clock-change identifier for the set of media items, wherein the group of media items is identified to include the second media item based on the first value of the clock-change identifier and the second value of the clock-change identifier being the same; and facilitate the capture-time correction for the group of media items based on the first capture-time correction for the first media item.

4. The system of claim 3, wherein the values of the clock-change identifier for the set of media items are determined based on change in time of a media capture device that captured the set of media items.

5. The system of claim 4, wherein the values of the clock-change identifier for the set of media items are changed based on the change in the time of the media capture device that captured the set of media items.

6. The system of claim 3, wherein the group of media items is identified for the capture-time correction based on determination that the first capture-time for the first media item is incorrect.

7. The system of claim 6, wherein the first capture-time for the first media item is determined to be incorrect based on a difference between the first capture-time for the first media item and a GPS time for the first media item.

8. The system of claim 7, wherein the first capture-time for the first media item is determined to be incorrect based on the difference between the first capture-time for the first media item and GPS time for the first media item being greater than twenty-six hours.

9. The system of claim 7, wherein the first capture-time for the first media item is determined to be incorrect further based on a GPS location for the first media item.

10. The system of claim 3, wherein facilitation of the capture-time correction for the group of media items includes automatically changing the capture-times for the group of media items based on the first capture-time correction for the first media item.

11. The system of claim 3, wherein facilitation of the capture-time correction for the group of media items includes prompting a user to suggest changing the capture-times for the group of media items based on the first capture-time correction for the first media item.

12. A method for correcting media capture-times, the method performed by a computing system including one or more processors, the method comprising:

obtaining, by the computing system, media item information, the media item information defining a set of media items, the set of media items including a first media item and a second media item;

obtaining, by the computing system, capture-time information for the set of media items, the capture-time information defining capture-times for the set of media items, the capture-times for the set of media items including a first capture-time for the first media item and a second capture-time for the second media item;

obtaining, by the computing system, clock change information for the set of media items, the clock change information defining values of a clock-change identifier for the set of media items, the values of the clock-change identifier for the set of media including a first value of the clock-change identifier for the first media item and a second value of the clock-change identifier for the second media item;

determining, by the computing system, a first capture-time correction for the first media item;

identifying, by the computing system, a group of media items for capture-time correction based on the values of the clock-change identifier for the set of media items, wherein the group of media items is identified to include the second media item based on the first value of the clock-change identifier and the second value of the clock-change identifier being the same; and facilitating, by the computing system, the capture-time correction for the group of media items based on the first capture-time correction for the first media item.

13. The method of claim 12, wherein the values of the clock-change identifier for the set of media items are determined based on change in time of a media capture device that captured the set of media items.

14. The method of claim 13, wherein the values of the clock-change identifier for the set of media items are changed based on the change in the time of the media capture device that captured the set of media items.

15. The method of claim 12, wherein the group of media items is identified for the capture-time correction based on determination that the first capture-time for the first media item is incorrect.

16. The method of claim 15, wherein the first capture-time for the first media item is determined to be incorrect based on a difference between the first capture-time for the first media item and a GPS time for the first media item.

17. The method of claim 16, wherein the first capture-time for the first media item is determined to be incorrect based on the difference between the first capture-time for the first media item and GPS time for the first media item being greater than twenty-six hours.

18. The method of claim 16, wherein the first capture-time for the first media item is determined to be incorrect further based on a GPS location for the first media item.

19. The method of claim 12, wherein facilitating the capture-time correction for the group of media items includes automatically changing the capture-times for the group of media items based on the first capture-time correction for the first media item.

20. The method of claim 12, wherein facilitating the capture-time correction for the group of media items includes prompting a user to suggest changing the capture-times for the group of media items based on the first capture-time correction for the first media item.

* * * * *